(12) United States Patent
Cain

(10) Patent No.: US 6,401,741 B1
(45) Date of Patent: Jun. 11, 2002

(54) EXCESS FLOW SHUT-OFF VALVE

(76) Inventor: Jimmy D. Cain, 1716 S. Dewey, Bartlesville, OK (US) 74003

( * ) Notice: Subject to any disclaimer, the term of this patent is extended or adjusted under 35 U.S.C. 154(b) by 0 days.

(21) Appl. No.: 09/707,542

(22) Filed: Nov. 7, 2000

(51) Int. Cl.[7] ............................................. F16K 17/32
(52) U.S. Cl. ......................... 137/10; 137/460; 137/463
(58) Field of Search ................................. 137/460, 463, 137/498, 499, 10

(56) References Cited

U.S. PATENT DOCUMENTS

| 1,500,587 A | | 7/1924 | Larson | |
|---|---|---|---|---|
| 1,788,368 A | * | 1/1931 | Brown | 137/460 |
| 2,266,533 A | * | 12/1941 | Brisbane et al. | 137/640 |
| 2,694,408 A | * | 11/1954 | McRae | 137/460 |
| 3,126,908 A | | 3/1964 | Dickens | 137/460 |
| 3,177,890 A | * | 4/1965 | Rosenberg | 137/460 |
| 3,273,588 A | | 9/1966 | Dollison | 137/460 |
| 3,765,443 A | | 10/1973 | Young | 137/460 |
| 3,768,506 A | | 10/1973 | McGill | 137/458 |
| 3,827,494 A | | 8/1974 | Crowe | 166/224 |
| 3,830,297 A | | 8/1974 | Crockell | 166/224 S |
| 3,850,242 A | | 11/1974 | Crowe | 166/224 A |
| 3,877,524 A | | 4/1975 | Glenn, Jr. | 169/17 |
| 4,278,102 A | | 7/1981 | Kelley et al. | 137/39 |
| 4,880,030 A | | 11/1989 | Terry | 137/460 |
| 5,038,820 A | * | 8/1991 | Ames et al. | 137/460 |
| 5,771,920 A | * | 6/1998 | Jewett et al. | 137/460 |

FOREIGN PATENT DOCUMENTS

| GB | 182191 | * | 6/1922 | 137/463 |
|---|---|---|---|---|

* cited by examiner

Primary Examiner—Stephen M. Hepperle

(57) ABSTRACT

An excess flow shut-off valve has a body with a flow passageway therethrough. A closure ball is rotatably supported within the body and has a flow passageway therethrough. The ball has a first rotational position in which the ball passageway is in alignment with the valve body passageway permitting flow through the valve and a second rotational position in which the flow passageway is out of alignment with the body flow passageway, preventing flow through the valve. A closure spring biases the ball towards the second (closed) position. An actuator has a first position holding the ball in the first (open) position. A paddle extending from the actuator into the body flow passageway. Fluid flow through said valve impinging on the paddle and tends to displace the actuator against the bias of the actuator spring. The bias of the actuator spring is overcome by excess fluid flow impinging on the paddle to thereby permit the ball to rotate to the valve closed position.

8 Claims, 3 Drawing Sheets

EXCESS FLOW SHUT-OFF VALVE

REFERENCE TO PENDING APPLICATIONS

This application is not related to any pending United States or international patent application.

REFERENCE TO MICROFICHE APPENDIX

This application is not referenced in any Microfiche Appendix.

BACKGROUND OF THE INVENTION

Valves are primarily used to close or open liquid or gas flow or to regulate the volume of flow. There are many types of valves, including gate valves, plug valves, ball valves and so forth. The valve of this invention has a different application—that is, to close-off flow in the event the flow rate through the valve exceeds a preselected limit. The valve can be used anywhere a liquid commodity is being pumped.

One use of the valve of this invention is to close or open flow from a large container under pressure to a smaller container, such as when delivering propane or butane from a tank truck to a residential location. For this purpose, a flexible hose is usually employed to extend from the tank truck to connect to a smaller container, usually through a meter, for delivering liquid to the smaller container. If for any reason the flexible hose or equipment connected to the flexible hose should rupture, a large quantity of liquid (and/or gases) could be suddenly released to the environment. This imposes a serious problem, particularly if the liquid is hazardous to health, combustible or most important, explosive. The valve of this invention provides a means of closing fluid flow if the rate of flow exceeds a preselected limit. By "fluid" flow, is meant throughout this disclosure, either liquid or gas or a combination of liquids and gases.

This is just one example of the use of the valve of this invention. The valve can be used not only with flexible hose connections but, also at storage tanks, loading and off-loading facilities and so forth—that is, in any application in which flow needs to be terminated when the flow rate becomes excessive.

Others have provided valves to close flow in the event of emergencies. As an example, U.S. Pat. No. 4,278,102 entitled, "DISASTER ACTIVATED SHUT-OFF VALVE" that issued on Jul. 14, 1981 to Kelley et al. provides a valve that is closed when the valve is subjected to shock or vibration such as produced by an earthquake.

U.S. Pat. No. 4,880,030 entitled, "SAFETY FLOW CONTROL FLUID SHUTOFF DEVICE" that issued on Nov. 14, 1989 to Terry provides a device to cut off fluid flow in the event of excess consumption—that is, excess of fluid flow rate.

For other examples of prior art relating to devices to control excess fluid flow reference may be had to the following U.S. Patents:

| U.S. PAT. NO. | INVENTOR | TITLE |
| --- | --- | --- |
| 1,500,587 | Larson | Automatc Safety Valve |
| 3,126,908 | Dickens | Well Tools |
| 3,273,588 | Dollison | Flow Control Valve for Use in A Well Tubing String |
| 3,765,443 | Young | Velocity Sensitive Safety Valve Mechanism |
| 3,768,506 | McGill | High/Low Flow Safety Valve |
| 3,827,494 | Crowe | Anti-Friction Ball Valve Operating Means |
| 3,830,297 | Cockrell | Sub-Surface Safety Valve with Improved Balancing Valve Means |
| 3,850,242 | Crowe | Subsurface Safety Valve |
| 3,877,524 | Glenn, Jr. | Fluid System |

BRIEF SUMMARY OF THE INVENTION

The invention herein provides an excess flow shut-off valve, the invention providing a valve body having a fluid flow passageway through it. A closure ball is rotatably supported within the valve body, the ball having a flow passageway therethrough in the general form of a traditional ball valve. The ball has a first rotational position in which the ball flow passageway is in alignment with the valve body flow passageway permitting flow through the valve. This is the valve open position. In a second rotational position, the ball flow passageway is out of alignment with the body flow passageway thereby preventing flow through the valve. This is the valve closed, or shut-off position.

A closure spring biases the ball towards the second—that is, the shut-off or closed position. The closure spring is preferably in the form of a coil spring that is wound around a stem extending from the ball.

An actuator has a first position holding the ball in the open condition. The actuator is preferably in the form of a slidable elongated member having one end that extends within a notch in the ball surface, the notch being spaced away from the passageway through the ball. When the ball is rotated against spring tension to the open position the actuator extends within the notch so that the ball is held against the closure spring bias in the open condition.

A paddle extends from the actuator into the body flow passageway. This paddle in the form of a surface that extends radially from the actuator and is impinged upon by fluid flow through the valve.

An actuator spring biases the actuator against displacement—that is, the actuator spring urges the actuator in the direction towards the ball so that the end of the actuator is maintained within the notch in the ball spherical surface thereby tending to retain the ball in the open position.

When the valve has been moved to the open position, which is accomplished by rotating the valve ball stem that is rotatably received within the valve body, and the actuator extends within the notch in the spherical surface of the ball, fluid can continue to flow through the valve, the rate of fluid flow being substantially undiminished by the paddle that extends from the actuator into the fluid flow stream. If the rate of fluid flow through the stream reaches a predetermined velocity the impact of fluid against the paddle overcomes the bias of the actuator spring, permitting the actuator to move against the bias of the spring and to thereby cause the actuator to be withdrawn from the notch in the ball spherical surface. When the actuator is withdrawn, the ball is free to rotate in response to the closure spring bias rotating the ball from the opened to the closed position blocking further fluid flow through the valve. Thus, the valve functions in response to excess flow to shut off flow through the valve.

When the condition that has resulted in excess flow has been corrected, the valve can be moved back to the open position by rotating the ball to the fully open position at which time the actuator again extends within the notch in the ball spherical surface. The valve will remain in the open condition and permit fluid flow unless and until the flow again exceeds the predetermined maximum flow rate.

The maximum flow rate is predetermined essentially by three factors—that is, (1) the relative cross-sectional area of the paddle; (2) the shape of the paddle (the paddle could be cup-shaped to create more drag); and (3) the bias imposed by the actuator spring. In addition, there is certain drag or frictional resistance against the movement of the actuator in response to force applied by fluid flow against the paddle. Using the principles of the invention, the dimensions of the valve components as well as the bias of the actuator spring can be calculated so that the valve can be designed to accurately respond to a predetermined excess fluid flow rate. Obviously, the nature of the fluid will enter into calculating the design parameters since a heavier fluid will exert more force against the paddle than a lighter fluid flowing at the same velocity.

For a better understanding of the invention reference may be had to the following drawings taken in conjunction with the detailed description of the preferred embodiment.

DETAILED DESCRIPTION OF A PREFERRED EMBODIMENT

Figure 3:
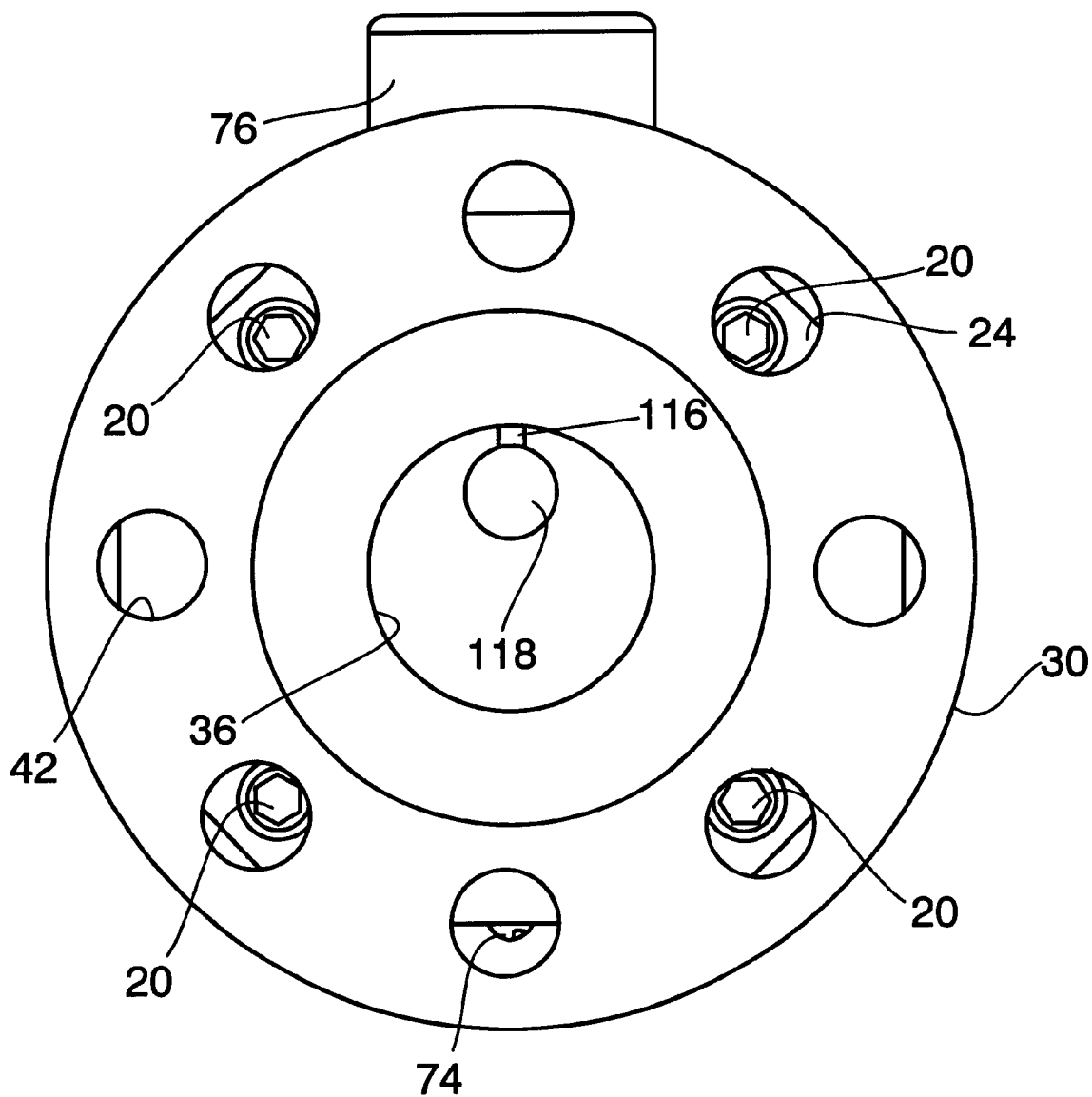
FIG. 3 is an elevational external end view of the valve of FIG. 1.

A preferred embodiment of a valve that embodies the principle of this invention is illustrated it being understood that the invention is broader than the illustrated embodiment that is described herein for purposes of exemplifying one application of the invention. The valve illustrated in the figures includes two basic body portions—that is, a ball housing 10 and a paddle housing 12. Ball housing 10 has a rearward surface 14 that abuts the paddle housing forward surface 16, there being a housing gasket 18 between abutting surfaces 14 and 16. The ball housing 10 and paddle housing 12 are removably secured to each other by four bolts that extend through openings (not seen) in the ball housing and into threaded recesses (not seen) in the paddle housing. The heads of such bolts are seen in FIG. 3, the bolt heads being identified by the numeral 20. The bolt heads 20 engage the rearward ledge 24 of ball housing 10.

Ball housing 10 has a rearward circumferential ledge surface 26 and integrally extending from it a reduced external diameter circumferential ball housing lip portion 28. Secured to ball housing 10 is a flange 30 having a forward end surface 32 that abuts against ball housing rearward circumferential ledge 26. The external surface of ball housing 10 adjacent rearward ledge 26 and the external surface of flange 30 adjacent end surface 32 are beveled to receive a circumferential weld 34 by which flange 30 is attached to ball housing 10.

Flange 30 is of a standard commercial type having a fluid passageway 36 therethrough and adjacent end surface 32 an increased internal diameter bore 38 that telescopically receives the ball housing circumferential lip portion 28. Flange 30 has an integral flange portion 40 having bolt openings 42 therein by which the flange and therefore the valve can be secured to piping. Flange 30 is an off-the-shelf commercial item with the possible exception of the increased internal diameter bore 38. Flange 30 is an illustration of one way for attaching ball housing 10 to a piping system. It can be easily seen that ball housing 10 may include a rearward circumferential ledge 26 that can be directly welded to equipment other than flange 10 or ball housing can be provided with integral threads. In other words, the method of attaching the ball housing to a fluid handling system is inclusive of any standard piping technology and flange 30 is illustrated as one means of making use of the valve of this invention but is not intended to limit the invention. Instead of flange 30, the end connection could be any different style of connection, including threaded, wafer or sandwich-style.

Rotatably supported in housing 10 is a ball 44 that has a fluid passageway 46 therethrough. Ball 44 is rotatably supported by a bottom stem 48 and a top stem 50. Bottom stem 48 is received in a vertical opening 52 in ball housing 10, the stem extending exteriorly of the ball housing. O-ring seals or other gasket systems are employed to prevent fluid leakage past bottom stem 48. Ball housing 10 has, in the bottom surface thereof, a recess 54 that houses a coiled closure spring 56. One end of spring 56 is secured to housing 10 and the other end to bottom stem 48. The function of closure spring 56 is to bias ball 44 to the valve closed or valve shut-off position. That is, the position in which the flow passageway 46 is out of alignment with the ball housing flow passageway 58. Upper stem 50 is rotatably supported in an opening 60 in ball housing 10. A valve stem bearing sleeve 62 rotatably supports top stem 50 in opening 60 and in like manner, a valve stem bearing sleeve 64 rotatably supports bottom stem 48. Top stem 50 is provided with a non-circular (such as a hexagonal) surface 66 on the upper end of top stem 50 so that a wrench, such as a socket wrench, can be applied to the stem to reset ball 44 as will be described subsequently.

An enlarged internal diameter opening 68 in ball housing 10 receives ball 44. A ball guide surface 70 is formed where passageway 58 enters into the enlarged opening 68.

Coil spring 56 received within recess 54 in the ball housing bottom surface is closed by a bottom cover 72 held in place by bolts 74.

Covering the portion of top stem 50 that extends beyond ball housing 10 is a top stem housing 76 having an open top end 78. A socket can be extended into stem housing 76 to engage hex surface 66 on the upper end of stem 50 so that the stem and thereby ball 44 may be rotated. A cover cap (not shown) may be positioned on stem housing 76. The cover cap is releasably retained and sealed by an O-ring 80 that fits in an external groove around top stem housing 76.

Paddle housing 12, the other major component of the excess shut-off valve illustrated in the drawings has a central passageway 82 that is in alignment with passageway 58 through ball housing 10. The outer end of paddle housing 12 has a circumferential ledge 84 and an integral reduced external diameter lip portion 86. A second flange 88 has an end surface 90 that abuts ledge 84 of the paddle housing and provides an area for a circumferential weld 92 by which the second flange is secured to the outer end of paddle housing 12. Second flange 88 is preferably, as illustrated, identical to first flange 30 so that one component may be used for both ends of the excess flow valve. Second flange 88 has a fluid passageway 94 through it that is in alignment with passageway 82 through paddle housing 12. As stated with reference to flange 30, flange 80 can be replaced by a threaded, a wafer or a sandwich-style end connection since the invention is not concerned with the particular end connection employed on the valve.

The ball housing has, adjacent the rearward surface 14, a slightly increased internal diameter opening 96 providing a circumferential ledge 98. Received within enlarged opening 96 and in abutment with ledge 98 is a toroidal ball seat 100 that has a sealing surface 102 that sealably engages the external spherical surface of ball 44. A forwardly extending integral portion of paddle housing 12 engages a rearward face of ball seat 100 holding it in position within the ball housing.

Formed within paddle housing 12 is a laterally extending small diameter opening 104. Slidably positioned in opening 104 is an actuator piston 106. The piston has, integrally extending from opposed ends, a reduced external diameter forward guide pin 108 and a similar rearwardly extending guide pin 110. Received within lateral opening 104 is a piston rearward bushing 112 that has an opening therein that slidably receives piston rearward guide pin 110. In like manner, a forward piston bushing 114 slidably receives actuator piston forward guide pin 108. Laterally extending from actuator piston 106 is a shaft 116 having secured at the outer end thereof a paddle 118.

Received within lateral opening 104 is a compression type actuator spring 120 that urges actuator piston 106 in the forward direction.

Formed on the external peripheral surface of ball 44 is a notch 122. A forward end portion of the actuator piston forward guide pin 108 extends within the notch 122 when ball 44 is in the open position as illustrated in FIG. 2, and when actuator piston 106 is forwardly advanced as illustrated.

OPERATION OF THE EXCESS FLOW SHUT-OFF VALVE

Figure 1:
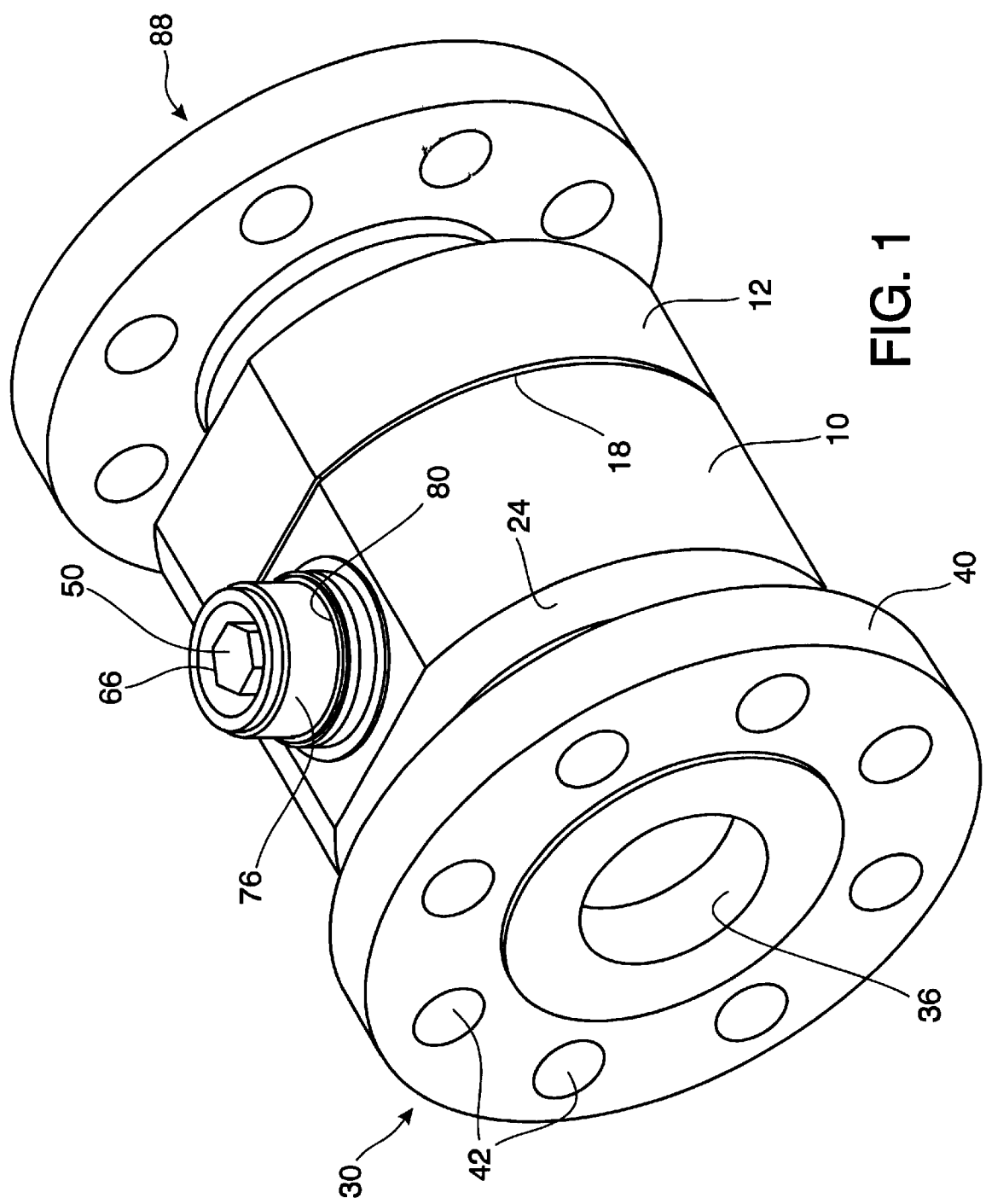
FIG. 1 is an external isometric view of an embodiment of the excess flow shut-off valve of this invention, the embodiment illustrated being exemplary of the preferred embodiment that incorporates the principles of this invention with the understanding that the actual appearance of a valve that incorporates the principles of this invention may vary considerably from that illustrated in FIG. 1.
Figure 2:
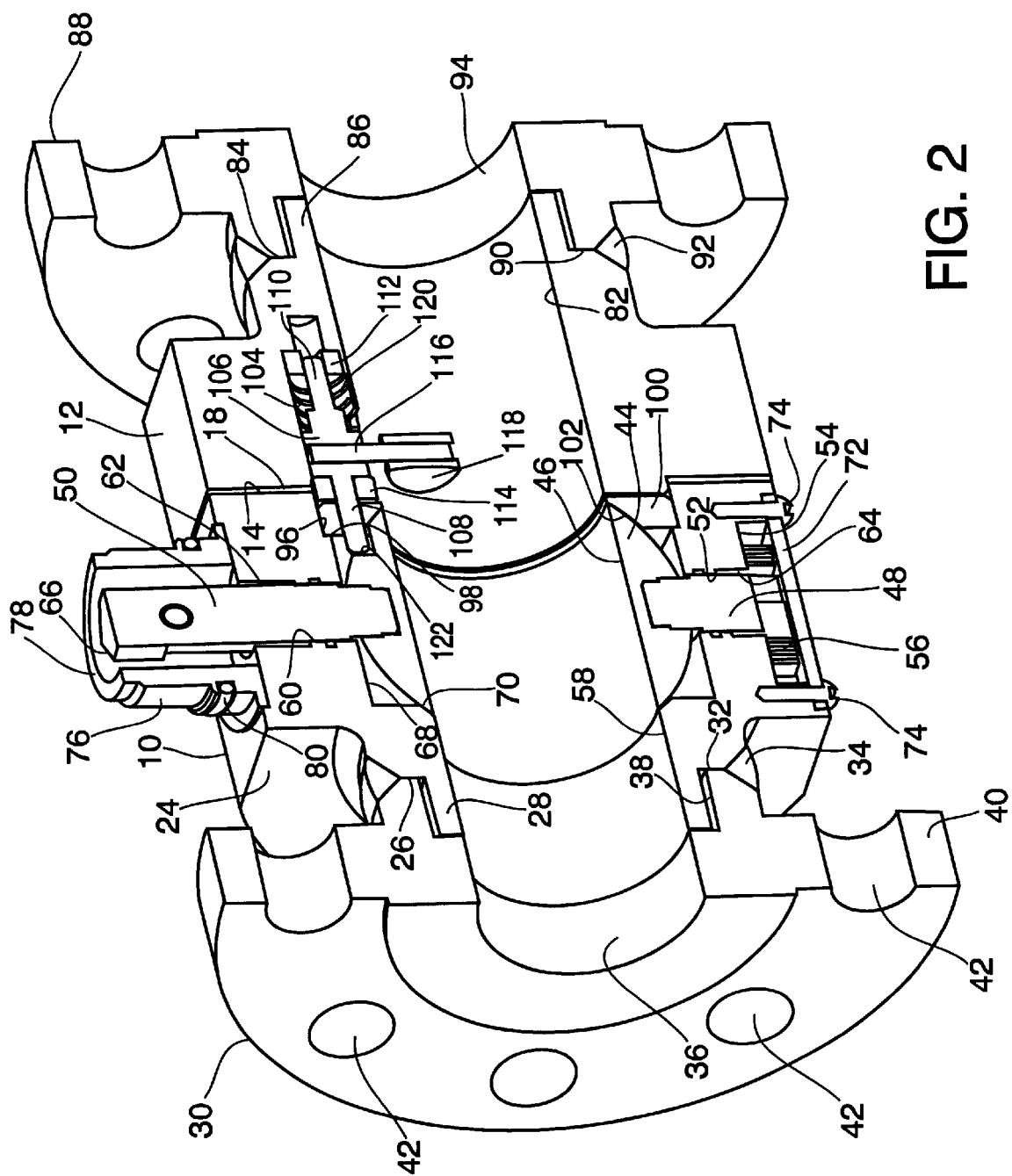
FIG. 2 is an elevational cross-sectional view of the valve of FIG. 1 showing the valve in the open position.

FIGS. 2 and 3 show the valve in the open position permitting fluid to freely flow through the valve. In the open position ball 44 is oriented so that the passageway 46 therethrough is aligned with passageways 58 and 82 respectively in ball housing 10 and paddle housing 12. Actuator piston 106 is forwardly positioned and urged in such forward position by actuator spring 120. Spring 56 that is coiled around bottom stem 48 is biassed to urge ball 44 to rotate towards the closed position however, rotation towards the closed position is prevented because actuator piston 106 is in the forward condition with forward guide pin 108 extending within notch 122 in valve ball 44. Thus in the condition as illustrated, fluid can freely flow through the valve; the fluid flow impinging on paddle 118. Paddle 118 is of dimension such that a relatively small restriction is imposed to flow through the valve and fluid can continue uninterruptedly. However, should a circumstance arise, such as a break in a hose or a fitting or the like, and fluid begins to flow at an excess rate, the impingement of fluid flow on paddle 118 urges actuator piston 106 in the rearward direction, against the compression of actuator spring 120. When the force of fluid flow is sufficient to overcome the compression of spring 120 and frictional resistance of movement of actuator piston 106, the actuator piston is displaced rearwardly, withdrawing actuator piston guide pin 108 from engagement with notch 122 in the peripheral surface of valve ball 44. This action allows ball 44 to rotate, by the urge of coil spring 56, to the closed position in which the passageway 46 in the ball is in an orientation that is perpendicular to the axis of flow passageways of 58 and 82—that is, to the valve closed position. The valve will remain closed as held in the closed position by the bias of spring 56.

When circumstances that have resulted in excess fluid flow have been corrected, the valve can be returned to the open position by engaging a wrench socket with hex surface 66 on upper stem 50, rotating the valve ball 44 ninety degrees back to the position as illustrated in FIG. 2. When the valve is rotated to the open position, recess 122 in the surface of ball 44 is aligned to receive forward guide pin 108 of actuator piston 106 so the ball is thereby locked in the open position. No other action is required to reset the valve to the open position other than applying rotational torque to the upper stem 50 to rotate ball 44.

The predetermined rate of fluid flow required to close the valve can be designed into the valve by selection of the size and shape of paddle 118 (that is, the larger the paddle the less the rate of fluid flow required to displace the actuator piston and if the paddle is cup-shaped it is displaced by a lower flow rate) and by the compression of spring 120. These three factors primarily predetermining the fluid flow rate required to close the valve. The identical structure of the valve can be maintained and different fluid flow closure rates can be selected merely by selecting an actuator spring 120 having a different compressive forces, or the size or shape of paddle 118 can be changed.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An excess flow valve comprising:
   a valve body having a flow passageway therethrough;
   a closure ball rotatably supported within said valve body and having a flow passageway therethrough, the closure ball having a first rotational position in which the ball passageway is in alignment with said valve body passageway permitting flow through said valve body and having a second rotational position in which the flow passageway is out of alignment with said body flow passageway preventing flow through the valve;
   a closure spring biasing said closure ball towards said second (closed) position;
   an actuator having a first position holding said closure ball in said first (open) position and a second position permitting said closure ball to rotate by spring actuation to said second (closed) position;

a paddle extending from said actuator into said body flow passageway, fluid flow through said valve impinging on the paddle and tending to displace said actuator to said second position; and an actuator spring biasing said actuator against displacement.

2. An excess flow check valve according to claim 1 wherein said actuator spring is replaceable to thereby provide for changing the flow rate that is required to move said actuator to said second position to close flow through the valve.

3. An excess flow valve according to claim 1 in which said closure ball is rotated about opposed stems received by said valve body and in which said closure spring is a coiled spring around one of the stems.

4. An excess flow valve according to claim 1 in which said actuator includes a longitudinally displaceable position member and wherein said actuator spring is a coiled spring in engagement with the piston member.

5. An excess flow check valve according to claim 4 wherein said paddle extends laterally from said piston member.

6. An excess flow valve according to claim 4 wherein said closure ball has a notch therein displaced from said closure ball flow passageway and wherein said piston member extends within said notch when said closure ball is in said first rotational position and said actuator is in said first position.

7. A method of closing fluid flow in the event of an excess fluid flow rate, comprising the steps of:

(a) providing a valve body having a flow passageway therethrough and a rotatable closure ball having a flow passageway through whereby flow is permitted when the closure ball is in a first position in which said passageways are in alignment and prohibited when said flow passageways are in a second position perpendicular to each other;

(b) biasing said closure ball towards said second position;

(c) releasably retaining said closure ball in said first position; and (d) releasing said closure ball when flow through said valve body flow passageway exceeds a predetermined rate.

8. A method of closing fluid flow in the event of excess flow rate according to claim 7 in which said valve body has a paddle extending into said body flow passageway and in which the paddle is displaced in response to a flow rate through said valve body flow passageway that exceeds a preselected maximum rate.

* * * * *